(12) United States Patent
Higurashi (10) Patent No.: US 6,959,087 B1
(45) Date of Patent: Oct. 25, 2005

(54) METHOD AND APPARATUS FOR TRANSMITTING ENCRYPTION-RESULTANT INFORMATION AND DECRYPTING INFORMATION

(75) Inventor: Seiji Higurashi, Fuchu (JP)

(73) Assignee: Victor Company of Japan, Ltd., Yokohama (JP)

( * ) Notice: Subject to any disclaimer, the term of this patent is extended or adjusted under 35 U.S.C. 154(b) by 855 days.

(21) Appl. No.: 09/697,084

(22) Filed: Oct. 27, 2000

(30) Foreign Application Priority Data

Nov. 26, 1999 (JP) .................................. 11-335502

(51) Int. Cl.$^7$ .......................... H04L 9/32; H04N 7/66; H04N 7/167; H04K 1/00
(52) U.S. Cl. ................ 380/201; 380/228; 380/255
(58) Field of Search ................ 380/201, 228; 308/201, 228, 225

(56) References Cited

U.S. PATENT DOCUMENTS

| | | | | |
|---|---|---|---|---|
| 4,807,287 A | * | 2/1989 | Tucker et al. .................. 380/51 |
| 5,406,627 A | * | 4/1995 | Thompson et al. ......... 380/237 |
| 5,613,004 A | * | 3/1997 | Cooperman et al. .......... 380/28 |
| 5,761,302 A | * | 6/1998 | Park .......................... 380/201 |
| 5,920,477 A | * | 7/1999 | Hoffberg et al. ............ 382/181 |
| 6,138,237 A | * | 10/2000 | Ruben et al. ................ 713/200 |
| 6,167,136 A | * | 12/2000 | Chou .......................... 380/201 |
| 6,282,040 B1 | * | 8/2001 | Bartlett .......................... 360/48 |
| 6,289,102 B1 | * | 9/2001 | Ueda et al. .................. 380/201 |
| 6,351,538 B1 | * | 2/2002 | Uz ............................... 380/201 |
| 6,363,210 B1 | * | 3/2002 | Owashi et al. .............. 380/277 |
| 6,411,613 B1 | * | 6/2002 | Seymour et al. ............ 370/347 |
| 6,424,371 B1 | * | 7/2002 | Wen ............................ 348/153 |
| 6,631,359 B1 | * | 10/2003 | Braitberg et al. ............. 705/50 |
| 6,665,240 B1 | * | 12/2003 | Kobayashi et al. ...... 369/47.15 |
| 2003/0046564 A1 | * | 3/2003 | Masuda et al. ............. 713/193 |
| 2003/0174760 A1 | * | 9/2003 | Rick et al. .................. 375/147 |

FOREIGN PATENT DOCUMENTS

| | | | | |
|---|---|---|---|---|
| EP | 755055 A2 | * | 1/1997 | ........... G11B 20/18 |
| EP | 0 802 535 A1 | | 10/1997 | |
| EP | 1 020 856 A2 | | 7/2000 | |
| WO | 97/18654 | | 5/1997 | |

* cited by examiner

Primary Examiner—R. Stephen Dildine
(74) Attorney, Agent, or Firm—Louis Woo (57) ABSTRACT

An information signal is transmitted. The information signal contains 1) encryption-resultant information, 2) an error correction code signal, and 3) decrypting information. The error correction code signal is designed for correction of at least one error in the encryption-resultant information. The error correction code signal is repetitively completed at a completion period. The decrypting information is designed for decryption of the encryption-resultant information. The decrypting information is repetitively completed piece by piece. At least one compete piece of the decrypting information is dispersively placed in a portion of the information signal which corresponds to the completion period of the error correction code signal.

8 Claims, 5 Drawing Sheets

| ID0 | | | | | | | | ID1 | | | | | | | |
|---|---|---|---|---|---|---|---|---|---|---|---|---|---|---|---|
| MSB | | | | | | | LSB | MSB | | | | | | | LSB |
| BIT 7 | BIT 6 | BIT 5 | BIT 4 | BIT 3 | BIT 2 | BIT 1 | BIT 0 | BIT 7 | BIT 6 | BIT 5 | BIT 4 | BIT 3 | BIT 2 | BIT 1 | BIT 0 |
| SEQUENCE NUMBER | | | | TRACK PAIR NUMBER | | | SYNC BLOCK NUMBER | | | | | | | | |
| 41 | | | | 42 | | | 43 | | | | | | | | |

FIG. 5

| SB # | CONTENTS |
|---|---|
| 6n | PC0 ( 1111, 1××× ) |
| 6n+1 | PC1 |
| 6n+2 | PC2 |
| 6n+3 | PC3 |
| 6n+4 | PC4 |
| 6n+5 | PC5 |

FIG. 7

METHOD AND APPARATUS FOR TRANSMITTING ENCRYPTION-RESULTANT INFORMATION AND DECRYPTING INFORMATION

BACKGROUND OF THE INVENTION

1. Field of the Invention

This invention relates to a method of transmitting encryption-resultant information and decrypting information. Also, this invention relates to an apparatus for transmitting encryption-resultant information and decrypting information. In addition, this invention relates to a method of recording encryption-resultant information and decrypting information on a recording medium. Furthermore, this invention relates to an apparatus for recording encryption-resultant information and decrypting information on a recording medium. In addition, this invention relates to a recording medium.

2. Description of the Related Art

It is known that original contents information is encrypted, and the encryption-resultant information and also decrypting information are recorded on an optical disc. Generally, the encryption-resultant information is assigned to a main recording area of the optical disc while the decrypting information is assigned to a lead-in area thereof. Disc players reproduce the encryption-resultant information and the decrypting information from the optical disc. Only disc players owned by legitimate users are able to decrypt the encryption-resultant information into the original contents information in response to the decrypting information.

It is conceivable that encryption-resultant information and decrypting information are recorded on separate areas of a magnetic tape. In this conceivable case, the following problems arise. Access to the decrypting information takes a long time during playback. There is some difficulty with playback from an intermediate point of the magnetic tape.

Also, it is conceivable that encryption-resultant information and decrypting information are recorded on a common area of a magnetic tape. In this conceivable case, a problem arises in the synchronization between the encryption-resultant information and the decrypting information during playback. In addition, the following problems arise. It is necessary to provide a surplus memory. Signal processing up to decoding takes a long time.

SUMMARY OF THE INVENTION

It is a first object of this invention to provide an improved method of transmitting encryption-resultant information and decrypting information.

It is a second object of this invention to provide an improved apparatus for transmitting encryption-resultant information and decrypting information.

It is a third object of this invention to provide an improved method of recording encryption-resultant information and decrypting information on a recording medium.

It is a fourth object of this invention to provide an improved apparatus for recording encryption-resultant information and decrypting information on a recording medium.

It is a fifth object of this invention to provide an improved recording medium.

A first aspect of this invention provides a method of transmitting information. The method comprises the steps of transmitting an information signal containing 1) encryption-resultant information, 2) an error correction code signal, and 3) decrypting information, the error correction code signal being for correction of at least one error in the encryption-resultant information, the error correction code signal being repetitively completed at a completion period, the decrypting information being for decryption of the encryption-resultant information, the decrypting information being repetitively completed piece by piece; and dispersively placing at least one compete piece of the decrypting information in a portion of the information signal which corresponds to the completion period of the error correction code signal.

A second aspect of this invention provides a method of recording information. The method comprises the steps of recording an information signal on a recording medium, the information signal containing 1) encryption-resultant information, 2) an error correction code signal, and 3) decrypting information, the error correction code signal being for correction of at least one error in the encryption-resultant information, the error correction code signal being repetitively completed at a completion period, the decrypting information being for decryption of the encryption-resultant information, the decrypting information being repetitively completed piece by piece; and dispersively placing at least one compete piece of the decrypting information in a portion of the information signal which corresponds to the completion period of the error correction code signal.

A third aspect of this invention provides a method of recording information. The method comprises the steps of recording a digital information signal on a recording medium, the digital information signal containing 1) decrypting information and 2) encryption resultants of video information and an error correction code signal, the error correction code signal being repetitively completed at a completion period corresponding to one of a predetermined number of recording tracks and a predetermined number of recording sectors, the decrypting information being for decryption of the encryption resultants, the decrypting information being repetitively completed piece by piece; and dispersively placing at least one compete piece of the decrypting information in a portion of the digital information signal which corresponds to the completion period of the error correction code signal.

A fourth aspect of this invention is based on the third aspect thereof, and provides a method wherein the recording medium comprises a magnetic tape.

A fifth aspect of this invention provides a tape-like recording medium formed with tracks each having a predetermined number of data blocks of a fixed length, segments of an information signal being recorded on respective data blocks in the tracks, the information signal containing 1) decrypting information and 2) encryption resultants of video information and an error correction code signal, the error correction code signal being completed in every unit corresponding to a predetermined number of tracks, the decrypting information being for decryption of the encryption resultants, the decrypting information being dispersively placed in the information signal so that the decrypting information is completed in every unit equal to the completion unit of the error correction code signal.

A sixth aspect of this invention provides an apparatus for transmitting information. The apparatus comprises means for transmitting an information signal containing 1) encryption-resultant information, 2) an error correction code signal, and 3) decrypting information, the error correction code signal being for correction of at least one error in the encryption-resultant information, the error correction code signal being repetitively completed at a completion period, the decrypting information being for decryption of the encryption-resultant information, the decrypting information being repetitively completed piece by piece; and means for dispersively placing at least one compete piece of the decrypting information in a portion of the information signal which corresponds to the completion period of the error correction code signal.

A seventh aspect of this invention provides an apparatus for recording information. The apparatus comprises means for recording an information signal on a recording medium, the information signal containing 1) encryption-resultant information, 2) an error correction code signal, and 3) decrypting information, the error correction code signal being for correction of at least one error in the encryption-resultant information, the error correction code signal being repetitively completed at a completion period, the decrypting information being for decryption of the encryption-resultant information, the decrypting information being repetitively completed piece by piece; and means for dispersively placing at least one compete piece of the decrypting information in a portion of the information signal which corresponds to the completion period of the error correction code signal.

An eighth aspect of this invention provides an apparatus comprising means for generating decrypting information for decryption of encryption-resultant information, the decrypting information being repetitively completed; means for combining main information and the decrypting information into composite information, the main information containing the encryption-resultant information and error correction code information, the error correction code information being repetitively completed; and means for synchronizing the repetitive completion of the decrypting information and the repetitive completion of the error correction code information in the composite information.

DESCRIPTION OF THE PREFERRED EMBODIMENTS

First Embodiment

Figure 1:
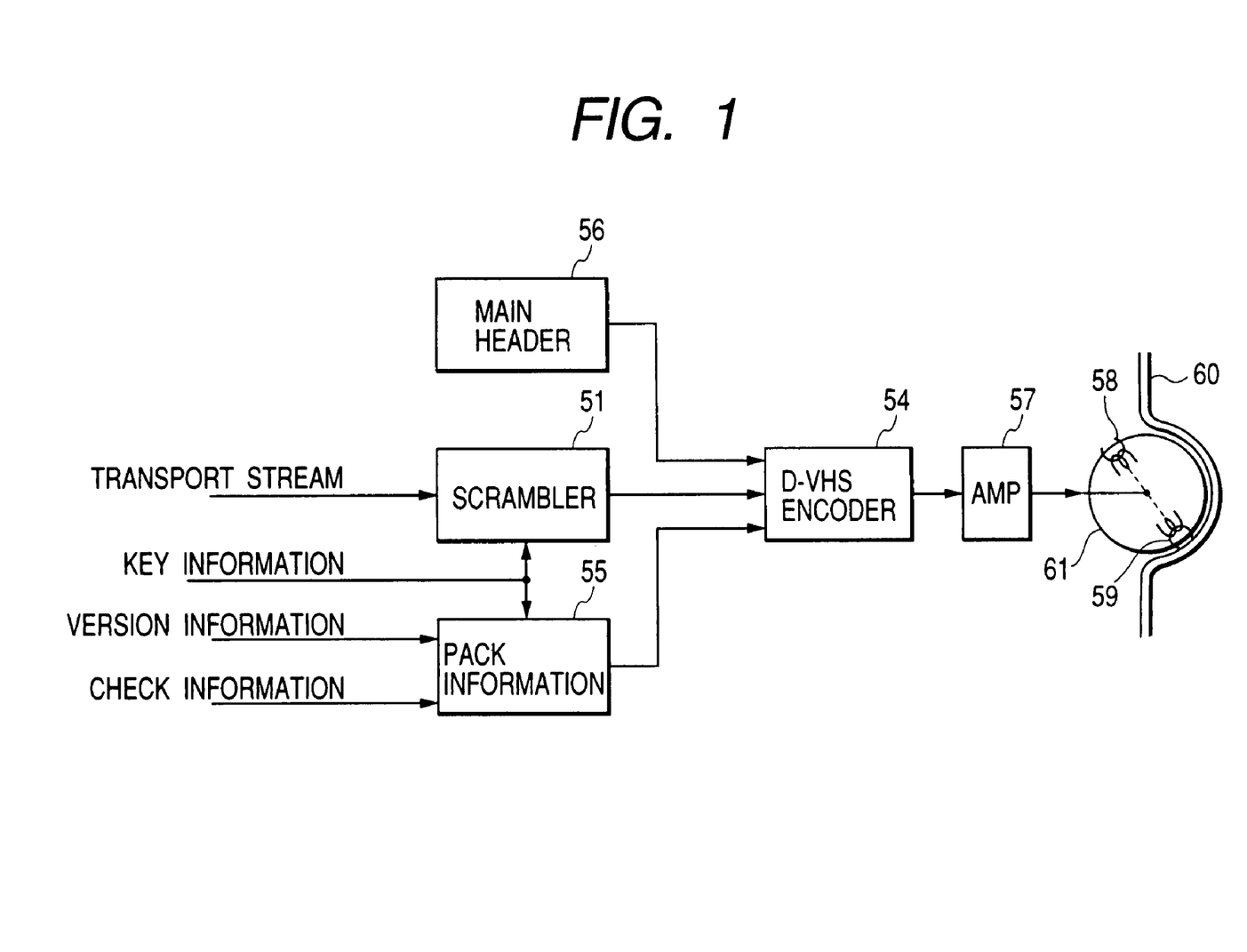
FIG. 1 is a block diagram of a recording apparatus according to a first embodiment of this invention.

FIG. 1 shows a recording apparatus according to a first embodiment of this invention. The recording apparatus in FIG. 1 includes a scrambler (an encryptor) 51. The scrambler 51 receives an input MPEG2 transport stream. Also, the scrambler 51 receives key information from a suitable device (not shown). The device 51 scrambles (encrypts) the input MPEG2 transport stream in response to the key information. The scrambler 51 outputs the scrambling-resultant MPEG2 transport stream to a D-VHS encoder 54.

A signal generator 55 receives the key information. Also, the signal generator 55 receives version information and check information from suitable devices (not shown). The signal generator 55 produces pack information in response to the key information, the version information, and the check information. The signal generator 55 outputs the pack information to the D-VHS encoder 54. The pack information contains decrypting information. The decrypting information has pieces equal to or corresponding to the key information, the version information, and the check information respectively. The decrypting information can be updated, for example, 30 bytes by 30 bytes. In other words, the decrypting information can be repetitively completed 30 bytes by 30 bytes. In this case, every 30-byte piece of the decrypting information is a unit.

Thus, the decrypting information can be repetitively completed piece by piece. Every complete piece of the decrypting information corresponds to, for example, 30 bytes.

A signal generator 56 produces main header information. The signal generator 56 outputs the main header information to the D-VHS encoder 54.

The D-VHS encoder 54 encodes and multiplexes the scrambling-resultant MPEG2 transport stream, the pack information, and the main header information into a signal of the D-VHS format. As previously mentioned, the pack information contains the decrypting information. The D-VHS encoder 54 outputs the D-VHS signal to a recording amplifier 57. The device 57 amplifies the D-VHS signal. The amplification-resultant signal is transmitted from the recording amplifier 57 to magnetic heads 58 and 59 via rotary transformers (not shown). The magnetic heads 58 and 59 periodically and alternately record the amplification-resultant signal, that is, the output signal of the recording amplifier 57, on a magnetic tape 60.

The magnetic heads 58 and 59 differ from each other in azimuth angle. The magnetic heads 58 and 59 are mounted on the circumferential surface of a rotary drum 61. The rotary drum 61 is rotated by a suitable servo mechanism (not shown). The magnetic heads 58 and 59 rotate together with the rotary drum 61. The magnetic heads 58 and 59 are diametrically opposed to each other. In other words, the magnetic heads 58 and 59 are spaced by an angular interval of 180 degrees. The magnetic tape 60 is wrapped on the circumferential surface of the rotary drum 61 in an angular range of about 180 degrees along a part of helix. A suitable mechanism (not shown) feeds the magnetic tape 60 relative to the rotary drum 61 at a constant speed. Recording tracks are successively formed on the magnetic tape 60 while the output signal of the recording amplifier 57 is recorded alternately by the magnetic heads 58 and 59. The recording tracks are slant with respect to the longitudinal direction of the magnetic tape 60.

Figure 2:
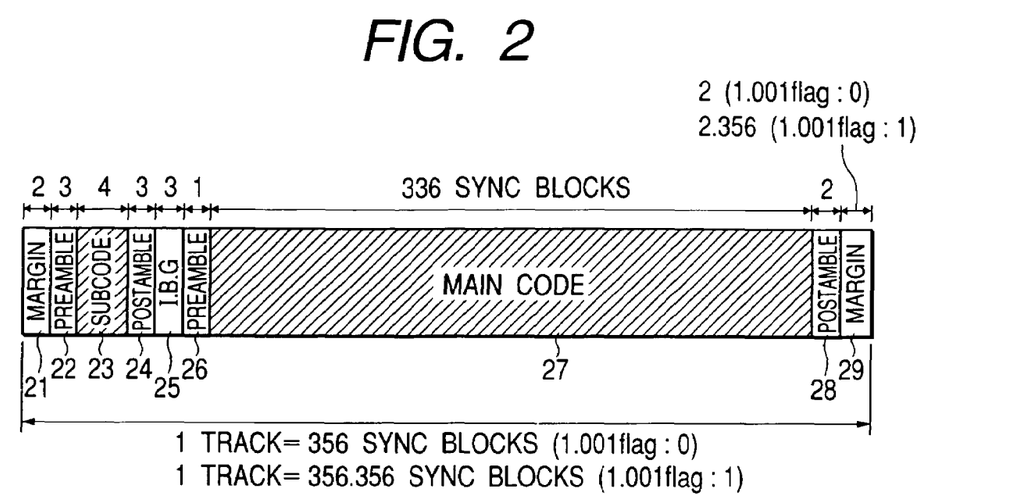
FIG. 2 is a diagram of the format of one recording track on a recording medium.

Each recording track on the magnetic tape 60 is composed of equal-size data blocks sequentially arranged in the direction of the scanning by the magnetic head 58 or 59. The data blocks are also referred to as the sync blocks (SB). As shown in FIG. 2, one recording track has a sequence of a front margin area 21 of 2 sync blocks, a preamble area 22 of 3 sync blocks, a sub code area 23 of 4 sync blocks, a post-amble area 24 of 3 sync blocks, an IBG area 25 of 3 sync blocks, a preamble area 26 of 1 sync block, a main code area (data area) 27 of 336 sync blocks, a post-amble area 28 of 2 sync blocks, and a rear margin area 29. The main code area 27 and the sub code area 23 can be used as information recording areas.

The speed of rotation of the rotary drum 61 can be changed by the servo mechanism between 30 rps and 29.97 rps. A "1.001" flag indicates whether the speed of rotation of the rotary drum 61 is equal to 30 rps or 29.97 rps. In the case where the "1.001" flag is in a state of "0", the rear margin area 29 is composed of 2 sync blocks. Thus, in this case, each recording track is formed by 356 sync blocks. In the case where the "1.001" flag is in a state of "1", the rear margin area 29 is composed of 2.356 sync blocks. Thus, in this case, each recording track is formed by 356.356 sync blocks. The sub code area 23 has a fixed length of 4 sync blocks and the main code area 27 has a fixed length of 336 sync blocks regardless of the state of the "1.001" flag. For example, each of 188-byte packets in the MPEG2 transport stream is recorded on two adjacent sync blocks in the main code area 27.

Figure 3:
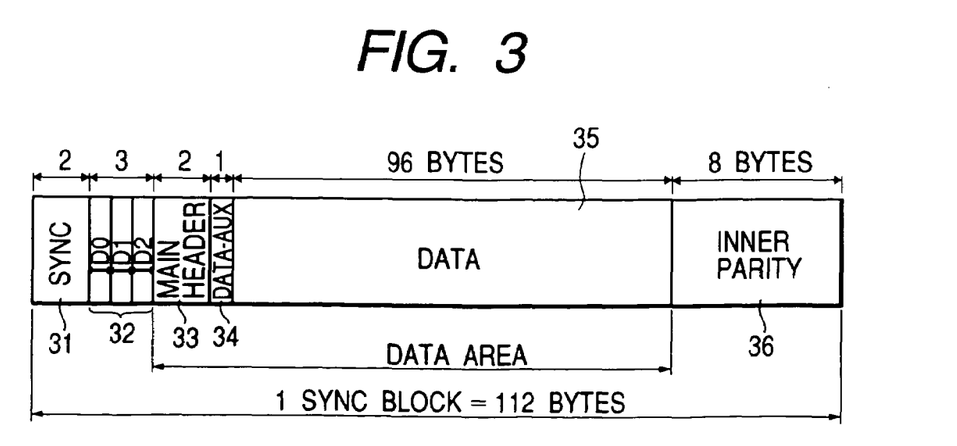
FIG. 3 is a diagram of the format of one data block (one sync block) in a main code area in FIG. 2.

As shown in FIG. 3, each of the sync blocks in the main code area 27 corresponds to 112 bytes in capacity (size), and has a sequence of sub areas 31, 32, 33, 34, 35, and 36. The first sub area 31 has 2 bytes, and stores a sync signal for enabling the present sync block to be reproduced. The second sub area 32 has 3 bytes, and stores address information composed of three 1-byte pieces ID0, ID1, and ID3 sequentially arranged in that order. The address information is also referred to as the identification (ID) information. The third sub area 33 has 2 bytes, and stores main header information composed of information pieces of different types. The fourth sub area 34 has 1 byte. The fourth sub area 34 is an auxiliary data (DATA-AUX) area. The fifth sub area 35 has 96 bytes, and stores effective data or real data. The fifth sub area 35 is also referred to as the data storing area 35. The sixth sub area 36 has 8 bytes, and stores an inner code signal or a signal of inner parities for correcting an error or errors in the information represented by the present sync block (the information represented by other sub areas, for example, the sub areas 31–35 or 33–35).

The third, fourth, and fifth sub areas 33, 34, and 35 form a 99-byte data area in which the latter 96 bytes compose the data storing area 35 assigned to effective information or real information. In the main-header storing area or the third sub area 33, format information is assigned to 4 higher bits in the first byte, and sync block information is assigned to 12 bits, that is, 4 lower bits in the first byte plus 8 bits in the second byte.

Figure 4:
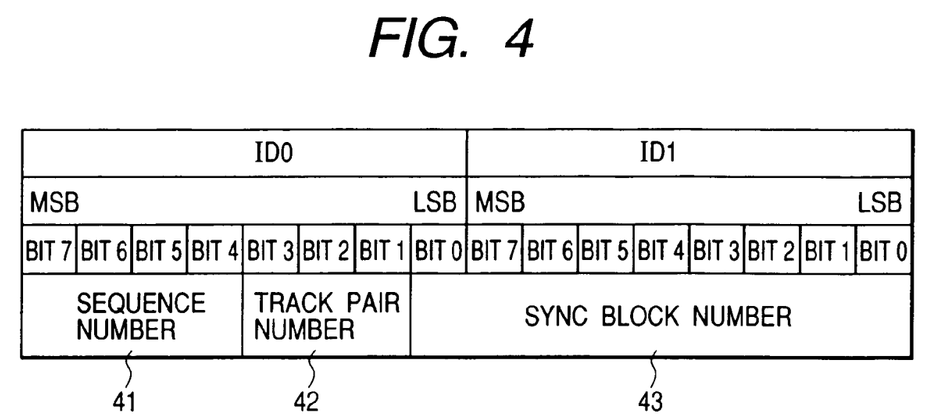
FIG. 4 is a diagram of the format of first and second 1-byte address information pieces ID0 and ID1 in FIG. 3.

In the second sub area 32, the 1-byte address information piece ID2 is an error-correction parity signal for the 1-byte address information pieces ID0 and ID1. As shown in FIG. 4, 4 higher bits (bit "7" to bit "4") in the address information piece ID0 represent a sequence number 41, and 3 intermediate bits (bit "3" to bit "1") therein represent a track pair number 42. The lowest bit (bit "0") in the address information piece ID0 and 8 bits (bit "7" to bit "0") in the address information piece ID1 represent a sync block number 43. Thus, 9 bits represent the sync block number 43.

The sequence number 41 depends on the period of the record signal and the repetition of an error correction code (ECC) signal. The error correction code (ECC) signal means an ECC-encoding-resultant signal containing a main information signal, an inner parity signal, and an outer parity signal. The error correction code signal is repetitively completed 6 tracks by 6 tracks. Accordingly, the sequence number 41 is incremented by "1" per 6 tracks. The signal recording period corresponds to 24 tracks. Accordingly, the sequence number 41 is reset to the initial value at a period of 24 tracks, and varies through one cycle for every time interval of 24 tracks.

Main data (for example, video data) and an outer code signal or a signal of outer parities compose the error correction code signal. As previously mentioned, the error correction code signal is repetitively completed 6 tracks by 6 tracks. The outer parity signal is shuffled 180 sync blocks by 180 sync blocks. Six sets of 30 (180 sync blocks divided by 6 tracks) outer-parity sync blocks resulting from every shuffle are placed in the main code areas 27 of 6 successive tracks respectively. Therefore, each main code area 27 stores 306 sync blocks loaded with the main data (for example, video data) and 30 sync blocks loaded with the outer parity signal. Every complete piece of the error correction code signal, that is, every piece of the error correction code signal which corresponds to 6 tracks, has 2,016 (336 multiplied by 6) sync blocks.

The track pair number 42 reflects the repetition of the error correction code signal. As previously mentioned, recording tracks are successively formed on the magnetic tape 60 while the output signal of the recording amplifier 57 is recorded alternately by the magnetic heads 58 and 59. Therefore, recording tracks relating to a first azimuth angle alternate with recording tracks relating to a second azimuth angle different from the first azimuth angle. A common track pair number 42 is assigned to each of adjacent first-azimuth and second-azimuth tracks. As previously mentioned, the error correction code signal is repetitively completed 6 tracks by 6 tracks. Thus, the track pair number 42 cyclically varies as "0→1→2→0→ . . . " in decimal notation. Specifically, a track pair number of "0" is assigned to a first pair of adjacent tracks. A track pair number of "1" is assigned to a second pair of adjacent tracks which follows the first pair. A track pair number of "2" is assigned to a third pair of adjacent tracks which follows the second pair. Then, a track pair number of "0" is assigned to a fourth pair of adjacent tracks which follows the third pair. This assignment of track pair numbers is iterated. Preferably, the track pair number 42 is represented by a binary code. In every pair, one track is discriminated from the other track on the basis of the difference between the azimuth angles.

The sync block number 43 indicates the arrangement order number of the present sync block among 336 sync blocks in the main code area 27.

The error correction code signal has components formed by inner parity signals (inner code signals) and outer parity signals (outer code signals). In every track (see FIG. 2), sync blocks extend over not only the main code area 27 but also the other areas 21–26, 28, and 29. Each sync block contains an inner parity signal (corresponding to the inner parity signal 36 in FIG. 3). Each sync block contains data whose errors can be corrected in response to the inner parity signal and an outer parity signal. Segments of the previously-mentioned error correction code signal which has a completion period of 6 tracks are distributed to only sync blocks in the main code areas 27, and are not assigned to sync blocks in the other areas 21–26, 28, and 29.

The decrypting information is repetitively completed 6 tracks by 6 tracks in synchronism with the error correction code signal having a completion period of 6 tracks. Each complete piece, that is, each 6-track-corresponding piece, of the decrypting information is assigned to the main code areas 27 of six successive tracks. This design enables a reproducing side to decode the decrypting information simultaneously with the decoding of the main data (for example, video data) in the main code areas 27. Furthermore, the error rate of the main data (for example, video data) in the main code areas 27 and the error rate of the decrypting information therein can be equalized to each other so that efficient information reproduction can be implemented.

As previously mentioned, the main code area 27 (see FIG. 2) in each track has 336 sync blocks of the format in FIG. 3. Each sync block in the main code area 27 has a 1-byte auxiliary data (DATA-AUX) area 34. The D-VHS encoder 54 is designed so that the pack information which contains the decrypting information will be recorded on the auxiliary data (DATA-AUX) areas 34 in selected ones of the sync blocks in the main code area 27 as a pack form.

Figure 5:
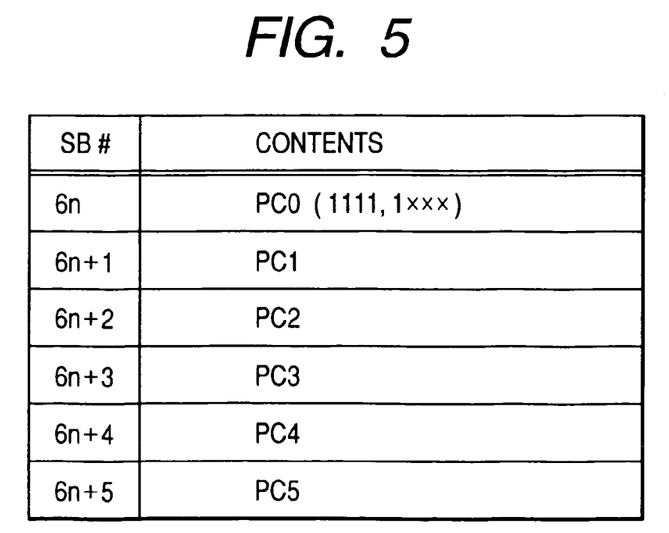
FIG. 5 is a diagram of the structure of one pack.

With reference to FIG. 5, the auxiliary data (DATA-AUX) areas 34 are separated into 6-byte groups loaded with 6-byte packs having a period corresponding to 6 sync blocks. Specifically, each group corresponding to one pack has the auxiliary data (DATA-AUX) areas 34 in six successive sync blocks. In each group (each pack), a pack header PC0 is recorded on the auxiliary data (DATA-AUX) area 34 in the first sync block $6n$, and pack pieces PC1, PC2, PC3, PC4, and PC5 following the pack header PC0 are recorded on the auxiliary data (DATA-AUX) areas 34 in the second, third, fourth, fifth, and sixth sync blocks $6n+1$, $6n+2$, $6n+3$, $6n+4$, and $6n+5$ respectively.

The pack header PC0 stores special information for identifying a time code, a program number, text data, TOC information, and decrypting information. Specifically, the pack header PC0 in which all of five higher bits are "1" indicates that the present pack stores a portion of the decrypting information or the subsequent pack pieces PC1–PC5 store a portion of the decrypting information. In other words, the pack header PC0 in a state of "11111xxx" indicates that the present pack stores a portion of the decrypting information. In the pack header PC0 of the decrypting-information store pack, three lower bits represent a page number which can change among 6 different values corresponding to 6 different pages respectively. Specifically, the page number can change among "000", "001", "010", "011", "100", and "101". Here, "pages" correspond to tracks, respectively.

As previously mentioned, the decrypting information is repetitively completed 6 tracks by 6 tracks, and every complete piece of the decrypting information is recorded on 6 successive tracks. In more detail, every complete piece of the decrypting information is recorded on 6 packs (decrypting-information store packs) which extend in 6 successive tracks respectively. Thus, in every track, one is selected from among packs as a decrypting-information store pack. Generally, every complete piece of the decrypting information has 30 bytes. Six 5-byte segments of every complete piece of the decrypting information are assigned to 6 packs (decrypting-information store packs) in 6 successive tracks, respectively. Thirty bytes of the six 5-byte segments are assigned, respectively, to the thirty pack pieces PC1–PC5 in 6 decrypting-information store packs in 6 successive tracks. In this way, every complete piece of the decrypting information is dispersively recorded on 6 successive tracks. Therefore, the decrypting information is prevented from adversely affecting other pack information. In addition, illegal recovery of the decrypting information is difficult.

The pack header PC0 of the decrypting-information store pack in first one of 6 successive tracks is in a state of "11111000". The pack header PC0 of the decrypting-information store pack in second one of 6 successive tracks is in a state of "11111001". The pack header PC0 of the decrypting-information store pack in third one of 6 successive tracks is in a state of "11111010". The pack header PC0 of the decrypting-information store pack in fourth one of 6 successive tracks is in a state of "11111011". The pack header PC0 of the decrypting-information store pack in fifth one of 6 successive tracks is in a state of "11111100". The pack header PC0 of the decrypting-information store pack in sixth one of 6 successive tracks is in a state of "11111101".

A reproducing side can detect every decrypting-information store pack by deciding whether all of five higher bits of a pack header PC0 are "1". The reproducing side can detect every group of 6 decrypting-information store packs loaded with one complete piece of the decrypting information by referring to the page numbers represented by the pack headers PC0. Accordingly, the reproducing side can detect every group of thirty pack pieces PC1–PC5 storing one complete piece of the decrypting information in response to the pack headers PC0.

The 6 different pages correspond 6 successive tracks in each group which stores one complete piece of the decrypting information. As previously mentioned, the decrypting information is recorded synchronously with the error correction code signal having a completion period of 6 tracks. This design enables a reproducing side to decode the decrypting information simultaneously with the decoding of the main data (for example, video data) in the main code areas 27. Furthermore, the error rate of the main data (for example, video data) in the main code areas 27 and the error rate of the decrypting information therein can be equalized to each other. In addition, the delay time of information processing can be minimized.

Complete pieces of the decrypting information which correspond to neighboring complete pieces of the error correction code signal are different or equal in contents.

Figure 6:
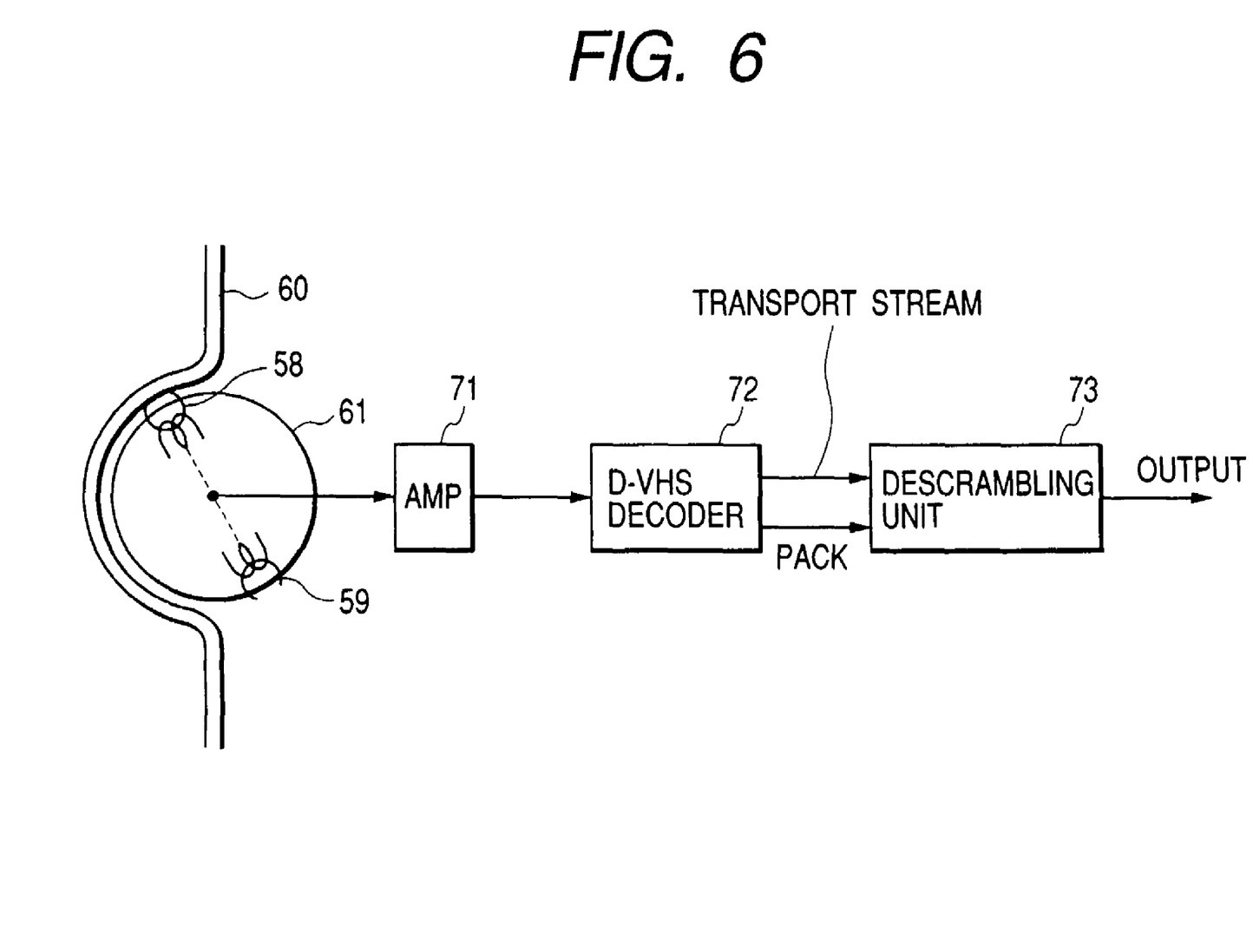
FIG. 6 is a block diagram of a reproducing apparatus in the first embodiment of this invention.

FIG. 6 shows a reproducing apparatus according to the first embodiment of this invention. The recording apparatus in FIG. 1 and the reproducing apparatus in FIG. 6 may be combined into a single VTR or VCR.

In the reproducing apparatus of FIG. 6, magnetic heads 58 and 59 on a rotary drum 61 alternately scan a magnetic tape 60, and reproduce a signal therefrom. The reproduced signal is transmitted from the magnetic heads 58 and 59 to a reproducing amplifier 71 via rotary transformers (not shown). The device 71 amplifies the reproduced signal. The reproducing amplifier 71 outputs the amplification-resultant signal to a D-VHS decoder 72. The device 72 decodes and demultiplexes the output signal of the reproducing amplifier 71 into an MPEG2 transport stream and pack information (a sequence of packs). The pack information comes from the auxiliary data (DATA-AUX) areas 34 in selected ones of the 336 sync blocks composing the main code area 27 for every recording track. The D-VHS decoder 72 outputs the MPEG2 transport stream and the pack information to a descrambling unit (decrypting unit) 73.

Figure 7:
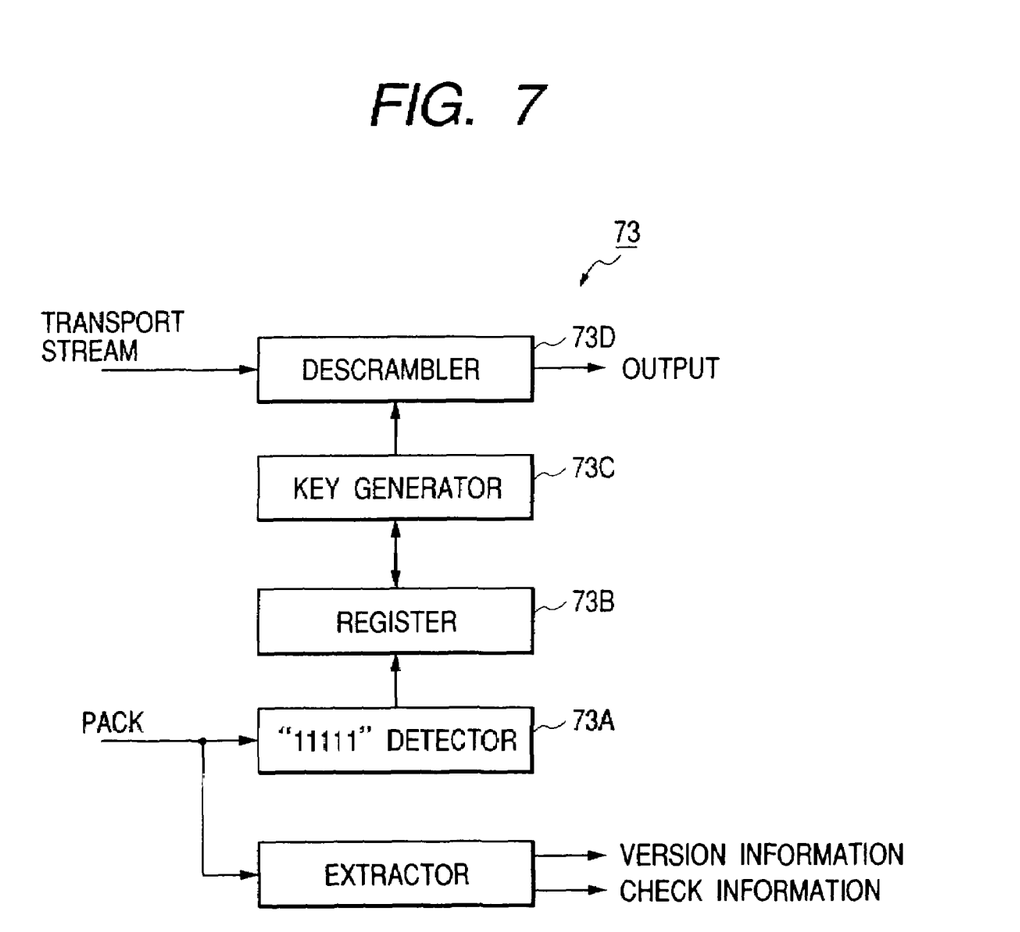
FIG. 7 is a block diagram of a descrambling unit in FIG. 6.

As shown in FIG. 7, the descrambling unit 73 includes a "11111" detector 73A, a fast-in fast-out register 73B, a key generator 73C, a descrambler (decryptor) 73D, and an extractor 73E.

The "11111" detector 73A receives the pack information (the sequence of packs) from the D-VHS decoder 72. The "11111" detector 73A senses every pack in which all of five higher bits of the pack header PC0 are "1". Thus, the "11111" detector 73A senses every decrypting-information store pack. Specifically, the "11111" detector 73A includes a comparator for deciding whether or not all of five higher bits of the pack header PC0 in every pack are "1". The "11111" detector 73A stores every sensed decrypting-information store pack into the register 73B. Generally, 6 decrypting-information store packs simultaneously exist in the register 73B during a normal operation stage except an initial stage.

The key generator 73C accesses 6 decrypting-information store packs in the register 73B. The key generator 73C decides whether or not the 6 accessed packs are in a common group for storing one complete piece of the decrypting information by referring to the pages represented by the pack headers PC0 of the packs. When the 6 accessed packs are in a common group, the key generator 73C reads out one complete piece of the decrypting information from the pack pieces PC1–PC5 in the accessed packs. The key generator 73C reproduces or recovers the key information from the read-out complete piece of the decrypting information. The key generator 73C feeds the reproduced key information to the descrambler 73D.

The descrambler 73D receives the MPEG2 transport stream from the D-VHS decoder 72. The device 73D descrambles or decrypts the MPEG2 transport stream in response to the key information fed from the key generator 73C. The descrambler 73D outputs the descrambling-resultant MPEG2 transport stream (the decrypting-resultant MPEG2 transport stream).

The extractor 73E receives the pack information (the sequence of packs) from the D-VHS decoder 72. The extractor 73E separates the version information and the check information from the pack information. The extractor 73E outputs the version information and the check information. In general, the version information and the check information are used in control of the reproducing apparatus.

It should be noted that the key generator 73C may be provided with a device for separating the version information and the check information from the complete piece of the decrypting information. In this case, the extractor 73E is omitted from the descrambling unit 73.

Second Embodiment

A second embodiment of this invention is a modification of the first embodiment thereof. The second embodiment of this invention is directed to recording and reproducing apparatuses (for example, digital-signal recording and reproducing apparatuses) of types different from the D-VHS types.

Third Embodiment

A third embodiment of this invention is a modification of the first embodiment thereof. The third embodiment of this invention is designed so that at least two complete pieces of the error correction code signal are recorded on 6 successive tracks.

Fourth Embodiment

A fourth embodiment of this invention is a modification of the first embodiment thereof. The fourth embodiment of this invention is designed so that a signal is recorded and reproduced on and from an optical disc or a magnetic disc. The error correction code signal and the decrypting information are recorded on the optical disc or the magnetic disc in a manner such that they are completed in every unit corresponding to a given number of sectors.

Fifth Embodiment

A fifth embodiment of this invention is a modification of the first embodiment thereof. The fifth embodiment of this invention is designed so that a signal of the formats in FIGS. 2 and 3 which contains the error correction code signal and the decrypting information is transmitted by an information processing apparatus such as a personal computer.

What is claimed is:

1. A method of transmitting information, comprising the steps of:
   encrypting input information into encryption-resultant information;
   combining 1) a portion of the encryption-resultant information in every prescribed data interval and 2) a decrypting information piece for decryption of the portion of the encryption-resultant information in the prescribed data interval into a combination-resultant information block;
   adding an error correction code signal to the combination-resultant information block to form an error correction data block; and
   outputting the error correction data block;
   wherein the decrypting information pieces are dispersively placed in the error correction data blocks in a manner such that one decrypting information piece is assigned to one error correction data block and hence every decrypting information piece can be reproduced from a corresponding error correction data block.

2. A method of recording information, comprising the steps of:
   encrypting input Information into encryption-resultant information;
   combining 1) a portion of the encryption-resultant information in every prescribed data interval and 2) a decrypting information piece for decryption of the portion of the encryption-resultant information in the prescribed data interval into a combination-resultant information block;
   adding an error correction code signal to the combination-resultant information block to form an error correction data block; and
   recording the error correction data block on a recording medium;
   wherein the decrypting information pieces are dispersively placed in the error correction data blocks in a manner such that one decrypting information piece is assigned to one error correction data block and hence every decrypting information piece can be reproduced from a corresponding error correction data block.

3. A method of recording information, comprising the steps of:
   encrypting input audio visual information into encryption-resultant information;
   combining 1) a portion of the encryption-resultant information in every prescribed data interval and 2) a decrypting information piece for decryption of the portion of the encryption-resultant information in the prescribed data interval into a combination-resultant information block;
   adding an error correction code signal to the combination-resultant information block to form an error correction data block; and
   recording the error correction data block on a portion of a recording medium which corresponds to a prescribed number of tracks or sectors:
   wherein the decrypting information pieces are dispersively placed in the error correction data blocks in a manner such that one decrypting information piece is assigned to one error correction data block and hence every decrypting information piece can be reproduced from a corresponding error correction data block.

4. A method as recited in claim 3, wherein the recording medium comprises a magnetic tape.

5. A tape-like recording medium formed with slant tracks and loaded with 1) encryption-resultant audio visual information, 2) decrypting information for decrypting the encryption-resultant audio visual Information, and 3) an error correction code signal added to a combination of the encryption-resultant audio visual information and the decrypting information, wherein a portion of the encryption-resultant audio visual information in every prescribed data interval and a piece of the decrypting information used for decrypting the portion of the encryption-resultant information in the prescribed data interval are combined into a combination-resultant information block, and a portion of the error correction code signal is added to the combination-resultant information block to form an error correction data block assigned to a prescribed number of ones among the slant tracks, and wherein pieces of the decrypting information are dispersively placed in error correction data blocks in a manner such that one piece of the decrypting information is assigned to one error correction data block and hence every piece of the decrypting information can be reproduced from a corresponding error correction data block.

6. An apparatus for transmitting information, comprising:
   means for encrypting input information into encryption-resultant information;
   means for combining 1) a portion of the encryption-resultant information in every prescribed data interval and 2) a decrypting information piece for decryption of the portion of the encryption-resultant information in the prescribed data interval into a combination-resultant information block;
   means for adding an error correction code signal to the combination-resultant information block to form an error correction data block; and
   means for outputting the error correction data block;
   wherein the decrypting information pieces are dispersively placed in the error correction data blocks in a manner such that one decrypting information piece is assigned to one error correction data block and hence every decrypting information piece can be reproduced from a corresponding error correction data block.

7. An apparatus for recording Information, comprising:
   means for encrypting input information into encryption-resultant information; means for combining 1) a portion of the encryption-resultant Information in every prescribed data interval and 2) a decrypting information piece for decryption of the portion of the encryption-resultant information in the prescribed data Interval into a combination-resultant information block;
   means for adding an error correction code signal to the combination-resultant information block to form an error correction data block; and
   means for recording the error correction data block on a recording medium;
   wherein the decrypting information pieces are dispersively placed in the error correction data blocks in a manner such that one decrypting information piece is assigned to one error correction data block and hence every decrypting information piece can be reproduced from a corresponding error correction data block.

8. An apparatus comprising:
   means for encrypting input information into encryption-resultant information;
   means for combining 1) a portion of the encryption-resultant information in every prescribed data interval and 2) a decrypting information piece for decryption of the portion of the encryption-resultant information in the prescribed data interval into a combination-resultant information block;
   means for adding an error correction code signal to the combination-resultant information block to form an error correction data block;
   wherein the decrypting information pieces are dispersively placed in the error correction data blocks in a manner such that one decrypting information piece is assigned to one error correction data block and hence every decrypting information piece can be reproduced from a corresponding error correction data block.

* * * * *